Figure 1:
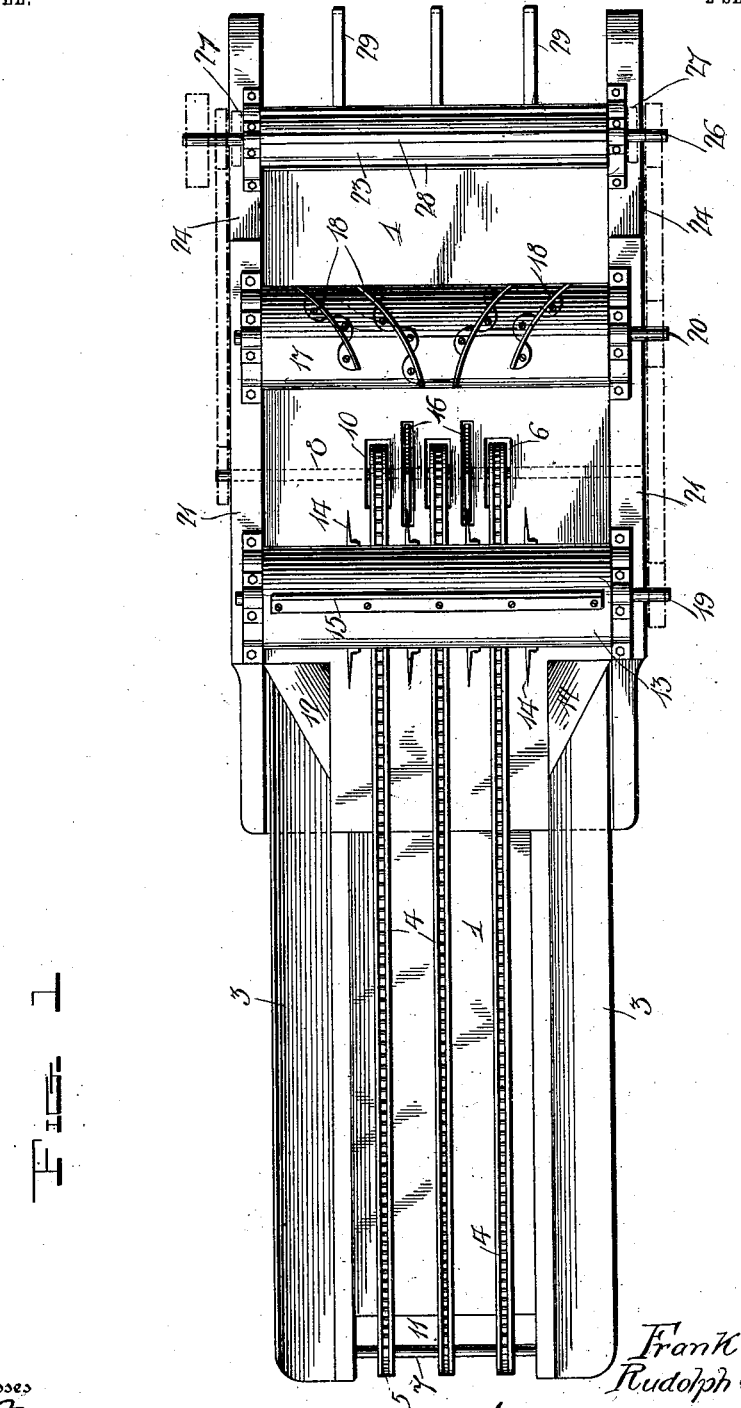

No. 747,456. PATENTED DEC. 22, 1903.
F. J. MAIN & R. C. WILDHAGEN.
BAND CUTTER AND FEEDER.
APPLICATION FILED MAR. 9, 1903.

NO MODEL. 2 SHEETS—SHEET 1.

Witnesses

Inventors
Frank J. Main and
Rudolph C. Wildhagen.
By W. W. Dudley & Co.
Their Attorneys No. 747,456. PATENTED DEC. 22, 1903.
F. J. MAIN & R. C. WILDHAGEN.
BAND CUTTER AND FEEDER.
APPLICATION FILED MAR. 9, 1903.
NO MODEL. 2 SHEETS—SHEET 2.
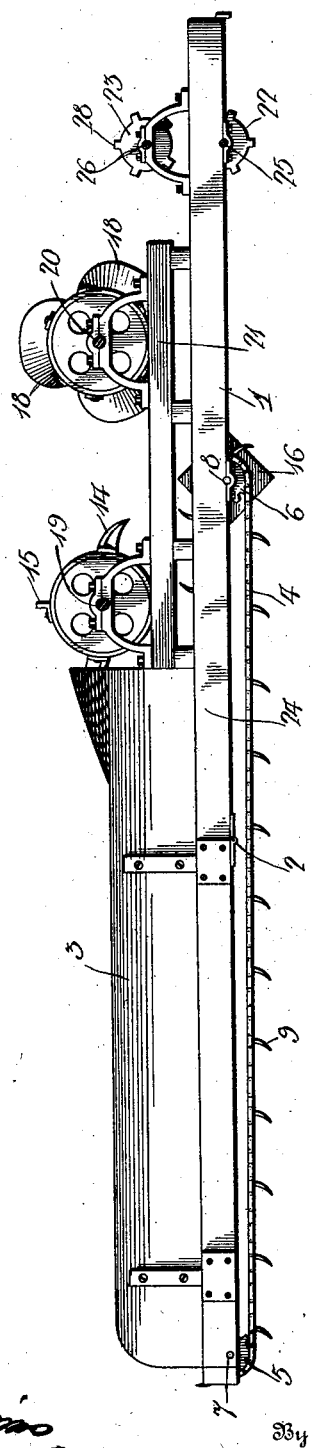
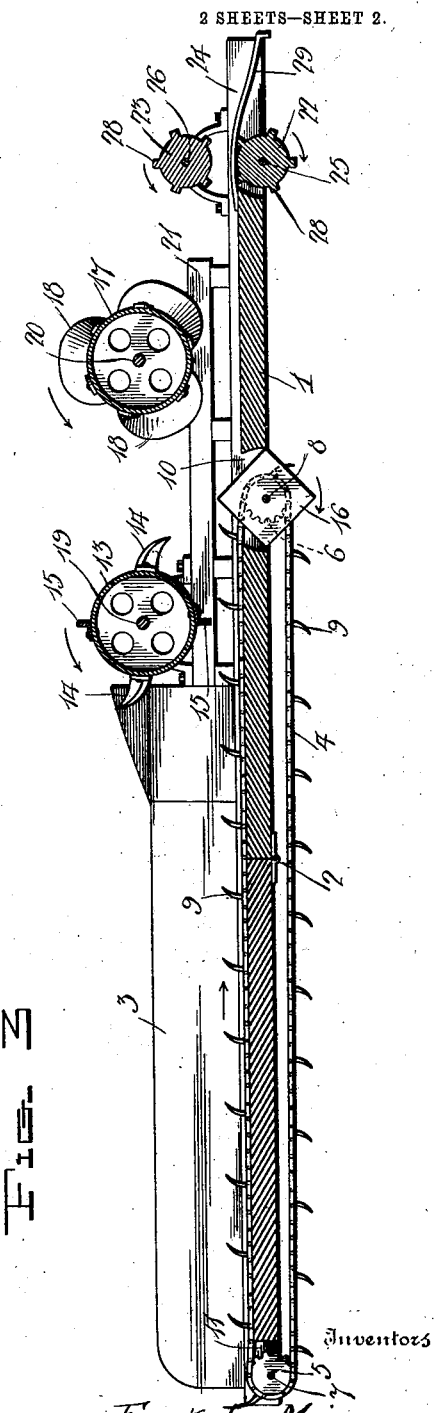
Witnesses
Inventors
Frank J. Main and
Rudolph C. Wildhagen
their Attorneys No. 747,456. Patented December 22, 1903.

UNITED STATES PATENT OFFICE.

FRANK J. MAIN AND RUDOLPH C. WILDHAGEN, OF MADISON, WISCONSIN.

BAND-CUTTER AND FEEDER.

SPECIFICATION forming part of Letters Patent No. 747,456, dated December 22, 1903.

Application filed March 9, 1903. Serial No. 146,982. (No model.)

*To all whom it may concern:*

Be it known that we, FRANK J. MAIN and RUDOLPH C. WILDHAGEN, citizens of the United States, residing at Madison, in the county of Dane and State of Wisconsin, have invented certain new and useful Improvements in Band-Cutters and Feeders; and we do hereby declare the following to be a full, clear, and exact description of the invention, such as will enable others skilled in the art to which it appertains to make and use the same.

This invention relates to appliances for automatically feeding corn to husking-machines, and has for its object the production of a comparatively simply-constructed appliance of this character possessing advantages in point of increased capacity and high efficiency, improved means being provided for severing the bands which bind the bundles, for spreading the stalks, and for positively feeding the spreaded stalks to the snapping-rolls of the husking-machine, all of which steps are carried into effect in a very expeditious manner without interruption and without danger of clogging the parts and impeding their operation.

Other advantages possessed by the invention are set forth in the following description, which is directed to the details of construction and operation, and in connection with which attention is called to the accompanying drawings, illustrating the improved automatic band-cutter and feeder in its preferred form of embodiment, it being understood that various modifications may be made therein without departing from the spirit of invention defined by the concluding claims.

In the drawings, Figure 1 is a plan view of an automatic band-cutter and feeder embodying our invention. Fig. 2 is a side elevation. Fig. 3 is a longitudinal central sectional view.

Referring to the drawings by numerals, 1 denotes a horizontally-arranged table which may be made in two sections hinged together at 2 to permit of folding for convenience in transportation. At each side of the forward end of the table is a removable board 3, transversely inclined, said boards serving to guide the bundle of cornstalks centrally along the table, over which is an endless conveyer in the form of preferably three sprocket-chains 4 4 4, each passing over sprocket-wheels 5 6. The sprocket-wheels 5 6 are respectively mounted on shafts 7 8, the shaft 8 being driven. The chains, which carry cornstalk-engaging pins 9 9, are supported in their upper travel on the table, and the sprocket-wheels 6 occupy slots 10 10 in said table, while the wheels 5 occupy a recess 11.

In practice the bundles are deposited singly on the table, the bundle being guided by the inclined boards 3 3 and engaged and moved rearwardly by the endless conveyer-chains 4 4. Each of the guide-boards 3 has at its rear end a guide extension 12, operating to direct the bundle centrally beneath a transversely-disposed roll 13, provided with a series of curved cutter-blades 14 14, the function of which is to sever the bands binding the bundles of stalks. The blades are arranged in opposite sets of preferably four each and extending longitudinally of the roll at opposite points. Midway between the sets of blades are ribs 15 15, which operate in conjunction with the conveyer to positively move the loosened stalks. The table between the guide-boards has a width sufficient only to accommodate a single bundle of stalks, whereby the bundle is compelled to move longitudinally of the table, and is delivered endwise beneath the roll 13, any tendency to sidewise movement being thereby precluded, and preferably the roll 13 is elevated above the table and carried a sufficient distance to prevent undue spreading apart of the stalks at this point of travel.

The conveyer-chains terminate beyond but adjacent to the roll 13, and to supplement the feeding action of the ribs 15 and conveyer there are provided, preferably, on the shaft 8 a plurality of rotatable feeder-disks 16 16, which occupy slots in the table and may have the square outline shown. Inasmuch as the severed bundle of stalks when engaged by the feeder-disks is practically intact said disks operate to feed the stalks uniformly and without spreading effect, it being understood from the above statement that said feeder-disks act only in conjunction with the conveyer and roll-ribs 15.

Located above the table and to the rear of the conveyer is a transverse roll 17, carrying at its periphery a plurality of spreader-blades 18 18, extending from the roll a distance sufficient to clear the table. The spreader-blades are of spiral form and incline from the center of the roll to the right and left, as shown in Fig. 1. The table beneath the roll 17 has a smooth upper surface to minimize friction.

The rolls 13 and 17 are respectively mounted on shafts 19 20, which have bearings in boxes supported from frames 21 21, erected at the sides of the table.

The practically intact bundle of stalks is delivered beneath the roll 17, centrally of the latter, by the feeding action of the ribs 15, conveyer, and disks 16, and the blades 18 operate to loosen the bundle and spread the stalks laterally to the right and left without materially impeding their feeding movement. In this manner the stalks are separated to extend evenly across the table, and in this condition are delivered, finally, to transverse feeding-rolls 22 23 at the rear end of the table.

The table at the rolls 13, 17, 22, and 23 is widened, and said widened portion is flanked by side bars 24 24, on which are secured the frames 21 21 and the boxes for the shaft 8 and the shafts 25 26 of the rolls 22 23. The side bars preferably extend beyond the rear end of the table, as shown.

The rolls 22 23, which are geared together, as indicated at 27, Fig. 1, are each provided with longitudinal ribs 28 28, and said ribbed rolls act conjointly to positively feed the spreaded stalks to the snapping-rolls of the husking-machine, the rolls being spaced apart sufficiently to effect said positive feed without the tendency to exert a snapping action on the ears of corn. It will be understood that the stalks previously to their travel between the rolls 22 23 are evenly distributed across the table and that in consequence said rolls operate by a drawing action to feed the stalks uniformly to the snapping-rolls. To support the stalks over the throat between the rolls 22 23 and the snapping-rolls, there are provided bridge-bars 29 29, which extend from the table to between the rolls and thence to a point closely adjacent to the snapping-rolls. By carrying the bars forwardly beyond the rolls all tendency to clogging is avoided, the bars constituting practically a continuation of the table. The bars are arranged longitudinally of the table and are separated sufficiently to allow the snapped ears to fall between them.

The several rotary parts are geared together and, with a shaft, connected with a suitable source of power, the gearing being indicated by the dotted lines in Fig. 1.

We claim as our invention—

1. In an automatic feeder for corn-huskers, the combination of feeding means including a roll, band-cutting blades carried by said feed-roll, a spreading-roll beyond the feed-roll having thereon right and left spiral spreading-blades, a pair of ribbed feed-rolls at the rear of the spreading-roll, and a table beneath the feed and spreading rolls and extending to the pair or ribbed feed-rolls.

2. In an automatic feeder for corn-huskers, the combination of a carrier, a ribbed feed-roll, band-cutting blades carried by said roll, a spreading-roll located to the rear of the carrier said roll having thereon right and left spiral spreading-blades, a pair of ribbed feed-rolls at the rear of the spreading-roll, and a table beneath the spreading-roll and extending to the feed-rolls.

3. In an automatic feeder for corn-huskers, the combination of an endless conveyer, a ribbed feed-roll coöperating with the conveyer to feed the stalks, band-cutting blades on said feed-roll, feeding-disks at the rear of the feed-roll, a spreading-roll at the rear of the conveyer and disks, a pair of ribbed feed-rolls at the rear of the spreading-roll, and a table beneath the spreading-roll and extending to the pair of feed-rolls.

4. In an automatic feeder for corn-huskers, the combination of an endless conveyer, a table over which said conveyer moves in its upper travel, feeding-disks on the rear conveyer-shaft, a ribbed feed-roll above the conveyer and in advance of the feeding-disks, a spreader-roll above the table and at the rear of the conveyer and disks, and a pair of ribbed feed-rolls at the rear end of the table.

5. In an automatic feeder for corn-huskers, the combination of a table, inclined guide-boards at the sides of the table at said forward end, an endless conveyer, a combined feed and band cutting roll above the conveyer, a spreader-roll at the rear of said feed-roll and conveyer, and a pair of ribbed feed-rolls at the rear of the spreader-roll.

6. In combination, a table, means for conveying and spreading the stalks thereover, a pair of feed-rolls at the end of said table, and bridge-bars extending from the table between and beyond said rolls.

In testimony whereof we affix our signatures in presence of two witnesses.

FRANK J. MAIN.
RUDOLPH C. WILDHAGEN.

Witnesses:
WM. A. CULVER,
JOHN S. MAIN.